(12) United States Patent
Carlblom

(10) Patent No.: US 8,823,532 B1
(45) Date of Patent: Sep. 2, 2014

(54) FLUID LEAK CONTAINMENT DEVICE

(76) Inventor: Rollin R. Carlblom, Chandler, AZ (US)

( * ) Notice: Subject to any disclaimer, the term of this patent is extended or adjusted under 35 U.S.C. 154(b) by 1022 days.

(21) Appl. No.: 12/615,745

(22) Filed: Nov. 10, 2009

Related U.S. Application Data

(60) Provisional application No. 61/113,292, filed on Nov. 11, 2008.

(51) Int. Cl.
*G08B 21/00* (2006.01)
*G01M 3/04* (2006.01)

(52) U.S. Cl.
USPC ........... 340/605; 340/606; 340/612; 340/604; 73/40

(58) Field of Classification Search
USPC .......................................... 340/605, 606, 612
See application file for complete search history.

(56) References Cited

U.S. PATENT DOCUMENTS

| | | | |
|---|---|---|---|
| 4,369,532 A * | 1/1983 | Houchins et al. | 4/619 |
| 4,903,723 A * | 2/1990 | Sublett | 137/312 |
| 5,008,652 A * | 4/1991 | Woloszyk | 340/605 |
| 5,339,676 A | 8/1994 | Johnson | |
| 5,645,103 A * | 7/1997 | Whittaker | 137/312 |
| 5,883,300 A | 3/1999 | Johnson | |
| 7,084,777 B2 | 8/2006 | Ninberg | |
| 7,124,772 B1 * | 10/2006 | Browning | 137/312 |
| 7,362,230 B1 | 4/2008 | Fish | |
| 7,455,029 B2 | 11/2008 | Janesky | |
| 8,094,031 B1 * | 1/2012 | Herrera et al. | 340/605 |
| 2007/0169256 A1 * | 7/2007 | Arraz | 4/251.1 |

* cited by examiner

*Primary Examiner* — Jack K Wang
(74) *Attorney, Agent, or Firm* — Schmeiser, Olsen & Watts LLP; Lowell W. Gresham; Brandt D. Madsen

(57) ABSTRACT

A fluid leak containment device (20) having a back wall (32), a left wall (38), a front wall (26), a right wall (44) and a base (24) is disclosed. The front wall (26) has a height (74) less than that the height (72) of the back wall (32), the left wall (38), and the right wall (44). The base (24) has plateaus (50) and valleys (52) that direct the flow of a fluid (22) to the front wall (26) if a leak does occur. A sensor (64) may be placed to provide additional auditory or visual alerts when fluids (22) are detected by the sensor (64) in fluid leak containment device (20).

25 Claims, 4 Drawing Sheets

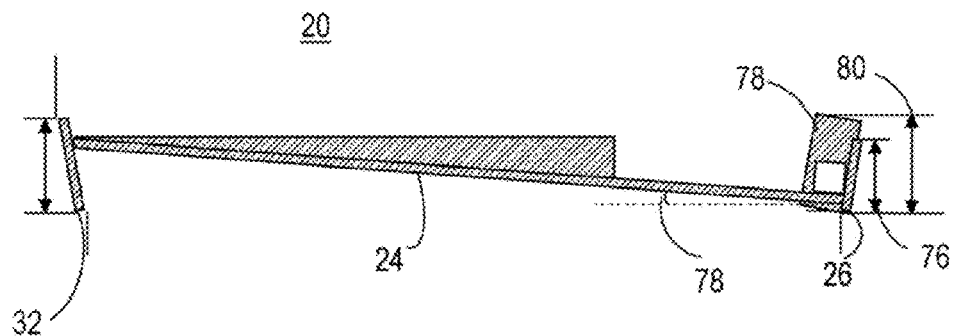
FIG. 5
FIG. 6
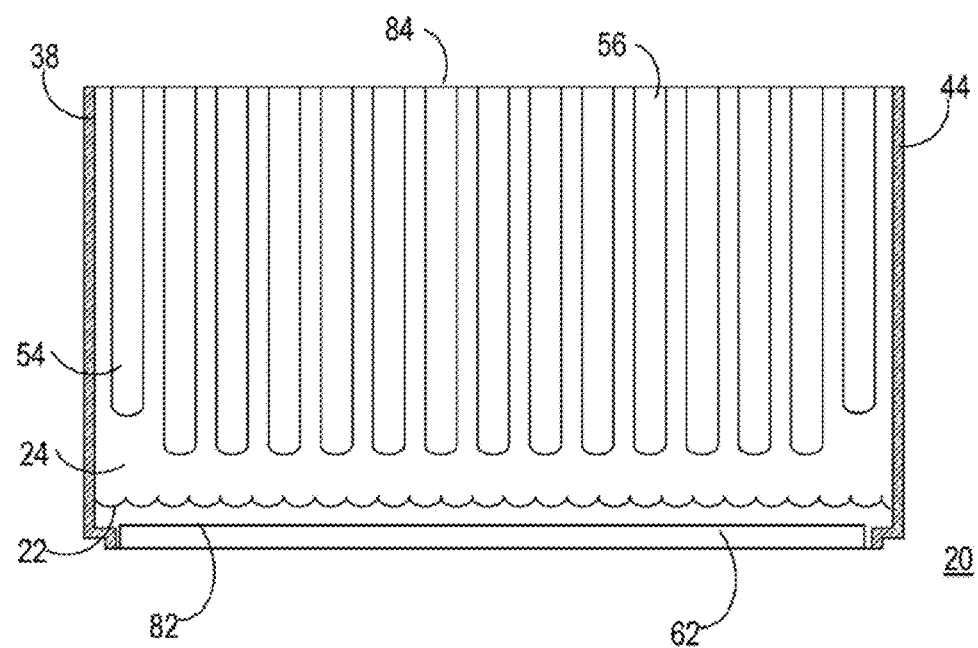

FLUID LEAK CONTAINMENT DEVICE

RELATED INVENTION

The present invention claims benefit under 35 U.S.C. 119 (e) to "Cabinet/Vanity Water-Leak Containment and Alerting Apparatus," U.S. Patent Application Ser. No. 61/113,292, filed 11 Nov. 2008, which is incorporated by reference herein.

TECHNICAL FIELD OF THE INVENTION

The present invention relates to the field of devices used to detect and manage leakage of fluids. More specifically, the present invention relates to devices particularly adapted to detect, and manage fluid leakage within cabinets

BACKGROUND OF THE INVENTION

In some locations, plumbing is prone to damage from freezing. And, fluid conduits and valves become more leak prone with age and use. Often, these conduits and valves are not replaced in a timely manner, increasing the likelihood of leakage. This lack of replacement and wear and tear from use is common in sinks and other household items that use running water. Accordingly, plumbing leaks are a common problem for a variety of reasons.

Almost all households have at least one sink that is mounted within a cabinet. Traditionally, in these cabinets the sink drain exits the bottom of the sink inside the cabinet. The drain pipes direct the flow water and other fluids poured into the sink from the drain, through the interior of the cabinet. As the drain pipe is rarely a single pipe, the junctions between the pipes, in addition to the pipes themselves, are often susceptible to leaks. Likewise, faucets and supply pipes for faucets are located inside and over cabinets so that leaks in these items flow down into the cabinets as well. And, in kitchen applications, dishwasher supply and drain lines are often routed within the same cabinet. Accordingly, the concentration of different plumbing systems in a cabinet can provide many opportunities for leaks inside the cabinet. Although the amount of fluid leakage may be minute for even an extended period of time, the damage due to the leak can start from within the cabinet, and extend to within the walls and into the floors.

One problem associated with an in-cabinet leak is that the leak may remain unnoticed for some time because it may be confined within the cabinet and the building structure hidden by the cabinet. Thus, by the time that the leak is eventually noticed considerable damage may have occurred, causing repairs to be far more costly than would be necessary had the leak been detected sooner. And in some situations, the damage is exacerbated by encouraging the growth of mold.

Devices that detect and collect water within a secondary collection unit increase the depth of the water collection device, reducing the available cabinet volume. Often, the user forgets to check the collection unit, only to discover that the secondary collection unit has overflowed and caused the very damage it was intended to prevent. Also, the user must manipulate the collection device in order to remove the secondary collection unit prior to the secondary collection unit overflowing. As a result, often the emptying of the secondary collection unit involves a level of disassembly of the collection device.

Some collection devices have an indicator that indicates the presence of a fluid leak. However, these indicators are often noticeable only when the user examines the secondary collection unit. Thus, the user must regularly check the secondary collection unit secured under the collection device to determine if there is a leak.

The interior width of a cabinet is often greater than the width of the cabinet door opening. As a result, it is difficult to put these traditional collection devices within the cabinet and then subsequently shift the device into position. Furthermore, once these devices are placed, they must be secured by some mechanism, often screwed into the cabinet or house wall.

It is therefore an object of the present invention to provide a fluid leak containment device that is able to detect and manage leaking water and act as a support upon which household items may be placed.

It is an additional object of the present invention to provide an inexpensive means for detecting fluid leaks and prevent fluid damage.

It is an additional object of the present invention to provide an inexpensive device that can be installed without damage to walls or cabinetry.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a cross-sectional view showing a fluid leak containment device in accordance with an alternative preferred embodiment of the present invention;

FIG. 6 shows a top view showing a fluid leak containment device in accordance with an alternative preferred embodiment of the present invention.

DETAILED DESCRIPTION OF THE PREFERRED EMBODIMENTS

Figure 1:
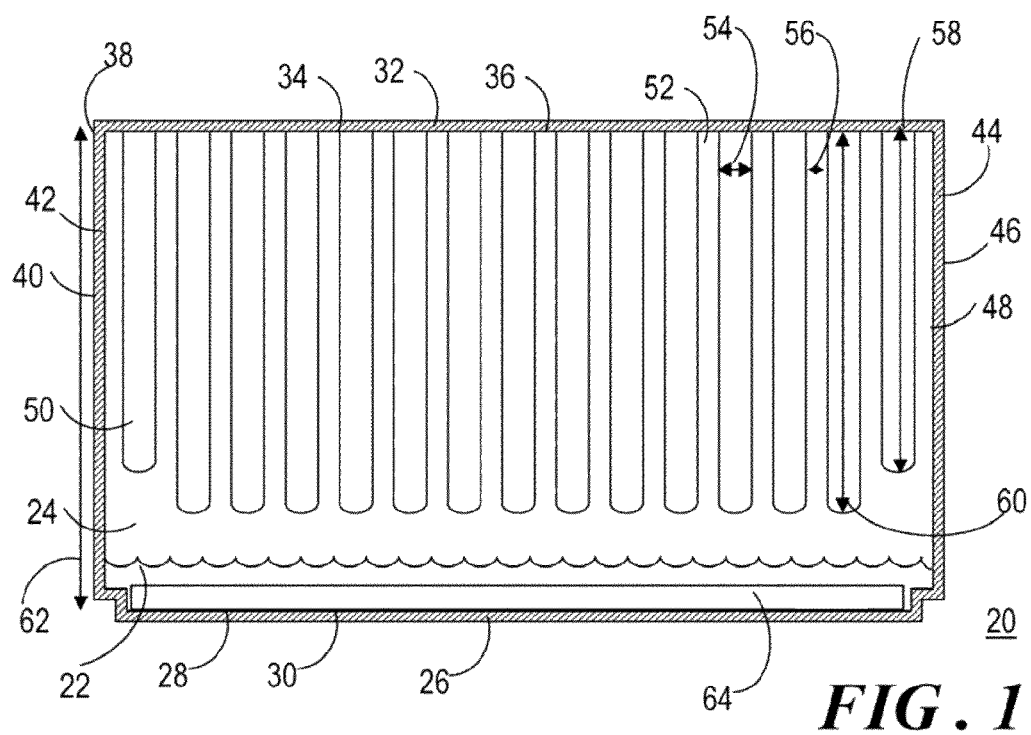
FIG. 1 shows a top view showing a fluid leak containment device in accordance with a preferred embodiment of the present invention.

FIG. 1 is a top view of a fluid leak containment device 20. Fluid leak containment device 20 is designed to collect and manage a fluid 22 that leaks from pipes, fluid valves or any other fluid flowing conduit (not shown). In one embodiment fluid leak containment device 20 is placed below the pipes, fluid valves or other fluid flowing conduit. In an alternate embodiment, fluid leak containment device 20 may have pipes, fluid valves or other fluid flowing conduits passing through it. In this embodiment, fluid leak containment device 20 abuts pipes, fluid valves or other fluid flowing conduits such that if a leak does occur, substantially all fluids 22 will be contained by fluid leak containment device 20.

Fluid leak containment device 20 includes a base 24, a front wall 26 having a top edge 28 and a bottom edge 30, a back wall 32 having a top edge 34 and a bottom edge 36, a left wall 38 having a top edge 40 and a bottom edge 42 and a right wall 44 having a top edge 46 and a bottom edge 48. Front wall 26, back wall 32, left wall 38 and right wall 44 are arranged in a box-like formation, surrounding base 24.

Base 24 provides a bottom surface for the box-like formation created by front wall 26, back wall 32, left wall 38, and right wall 44. Base 24 includes at least one plateau 50 and at least one valley 52. In one embodiment, base 24 includes more than one plateau 50 and more than one valley 52. In this embodiment, a width 54 of plateau 50 is greater than a width 56 of valley 52. In one embodiment, plateaus 50 near left wall 38 and right wall 44 have a shorter length 58 than the length 60 of other plateau 50. This shorter length 58 provides special areas for additional devices such as a sensor (discussed below) or a reverse osmosis shut off switch (not shown) that respond to the presence of fluid 22 in fluid leak containment device 20.

Base 24 is sloped downward from back wall 32 to front wall 26 (discussed below). As a result, the slope of valley 52 provides a conduit for fluid 22 to flow toward front wall 26 when fluid 22 leaks from the pipe, fluid valve or other fluid flowing conduit (not shown). Thus, when a leak occurs, a user can see fluid 22 collecting near front wall 26 when the user checks base 24. It is desirable that length 60 of plateau 50 be less than then length 62 of left wall 38 and right wall 44 providing an area for fluid 22 from all valleys to collectively pool. Also, such an area provides an area to locate a sensor (discussed below)

In one embodiment, fluid leak containment device 20 is also a storage surface upon which items (not shown) may be placed. In this embodiment plateau 50 resides in substantially a common plane that is horizontal and level when fluid leak containment device 20 is resting on a horizontal surface. The top surface of base 24 is sloped from the plane defined by plateau 50 at an angle (discussed below). Thus, items may be placed upon a level surface consisting of plateau 50, such that, if a fluid leak does occur, fluid 22 will flow in valley 52, and items place upon plateau 50 will not become wet.

In one embodiment, fluid leak containment device 20 also includes a sensor 64. Sensor 64 detects a fluid leak by sensing the presence of fluid 22 in fluid leak containment device 20. In one embodiment, a conventional moisture sensor which includes a battery, moisture-sensing circuit, and alerting device is used for sensor 64. Once sensor 64 detects a fluid leak, sensor 64 will trigger an alert to notify a user of the leak. In one embodiment, sensor 64 emits an audible alert when fluid 22 is detected. In an alternate embodiment, sensor 64 emits a visible alert. In still another embodiment, a combination of an audible and visible alert is used to notify a user of the presence of a leak. One skilled in the art will recognize that although in FIG. 1 sensor 64 has been placed near the front wall 26, the lowest point of valley 52, that sensor 64 may be placed at any position on fluid containment device 20 to detect the presence of fluid 22.

Fluid leak containment device 20 can be placed within the interior space of a cabinet (not shown). When placed within a cabinet, back wall 32, left wall 38, and right wall 44 desirably extent to or near either cabinet walls or building walls (not shown). Front wall 26 desirably abuts the door (not shown) of the cabinet. In this embodiment, top edge 28 of front wall 26 can permit the spillover of fluid 22 from fluid leak containment device 20 such that fluid 22 flows outside of the cabinet rather than within the cabinet. It is desirable that spillover of fluid 22 happen only at front wall 26 as it provides an alert of the presence of a leak by spilling fluid outside the cabinet. Furthermore, by providing such a spillover outside of the cabinet, it is less likely damage will be done to the interior of the cabinet. The presence of front wall 26 provides an opportunity for the user to notice the pooling of fluid 22 prior to the spillover. The pooling of fluid 22 also increases the reliability of sensor 64 in detecting a fluid leak.

Fluid leak containment device 20 is manufactured such that fluid leak containment device 20 may be easily bent and folded back on itself and then restored to an original shape without cracking or otherwise damaging fluid leak containment device 20. This malleability permits fluid leak containment device 20 to be folded and/or bent during the installation within cabinets or other spaces (not shown) in which the opening to the interior space is smaller than the area enclosed by the interior space. In one embodiment, fluid leak containment device 20 is molded from a thermoplastic material, such as acrylonitrile butadiene styrene (ABS) at a thickness of around 0.040 inch.

Figure 2:
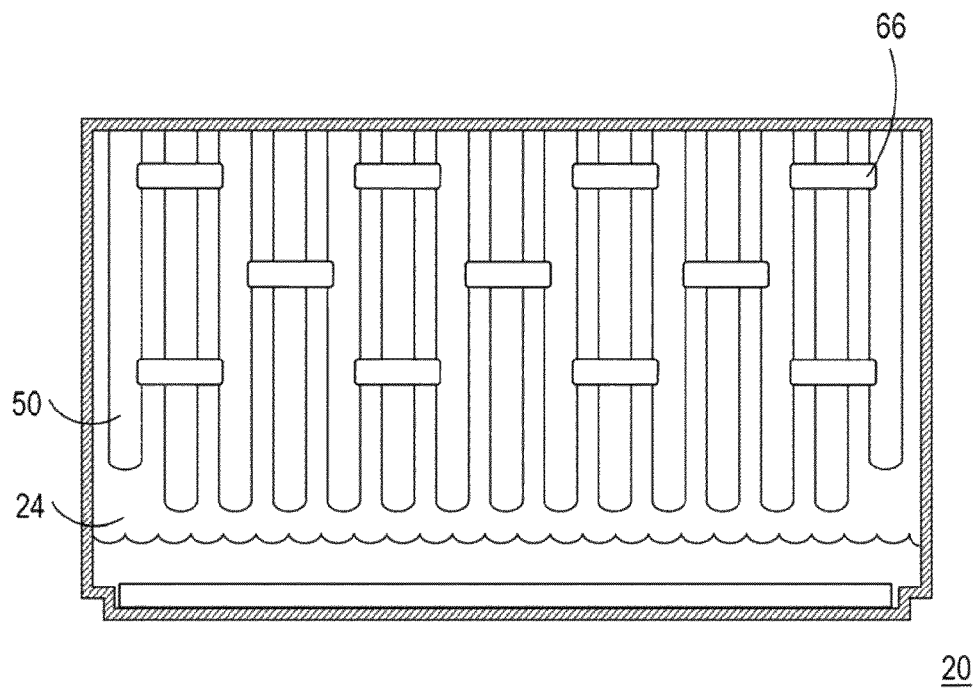
FIG. 2 shows a top view showing a fluid leak containment device in accordance with an alternative preferred embodiment of the present invention.

FIG. 2 is a top view of an alternate embodiment of fluid leak containment device 20. Additional supports 66 may be used to support fluid leak containment device 20 when fluid leak containment device 20 rests upon a surface (not shown). Additional supports 66 extend from base 24 to the surface upon which fluid leak containment device 20 rests. Additional supports 66 increase the surface area of fluid leak containment device 20 that is in contact with the resting surface. Also, additional supports 66 provide additional strength to the structure of plateaus 50, allowing plateaus 50 to support heavy objects, such as reverse osmosis units (not shown).

Figure 3:
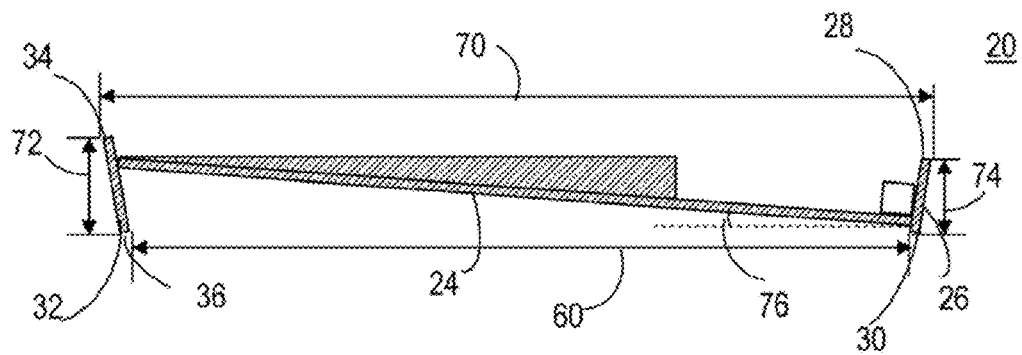
FIG. 3 shows a cross-sectional view showing a fluid leak containment device in accordance with a preferred embodiment of the present invention.

FIG. 3 is a cross-sectional view of an embodiment of fluid leak containment device 20 showing front wall 26, back wall 32 and base 24. Front wall 26 and back wall 32 are angled such that the distance 68 between bottom edges 30 and 36 is less than the distance 70 between top edges 28 and 34. This angling is also present in left wall 38 and right wall 44 (discussed in reference to FIG. 7). By having this angled structure, multiple fluid leak containment devices 20 can be stacked one within another for storage, inventory, and distribution purposes.

The height 72 of back wall 32 is greater than the height 74 of front wall 26. The greater height of back wall 32 provides a greater height from which base 24 can be angled downward. The reduced height of front wall 26 also provides a method of alerting a user to the presence of a leak, as the reduced height will result in a spillover of fluid 22 from front wall 26 before such a spill would occur in back wall 32. In one embodiment, left wall 38 and right wall 44 each have a height (not shown) equal to height 72 of back wall 32.

Valley 52 of base 24 is sloped downward from back wall 32 to front wall 26. The slope of valley 52 is at an angle 76. Angle 76 is determined as the angle necessary to ensure that the plateau 50 remains parallel to the surface upon which fluid leak containment device 20 is sitting. This allows the use of plateau 50 as a surface upon which to store and place items without the items becoming wet in the event a fluid leak does occur.

Figure 4:
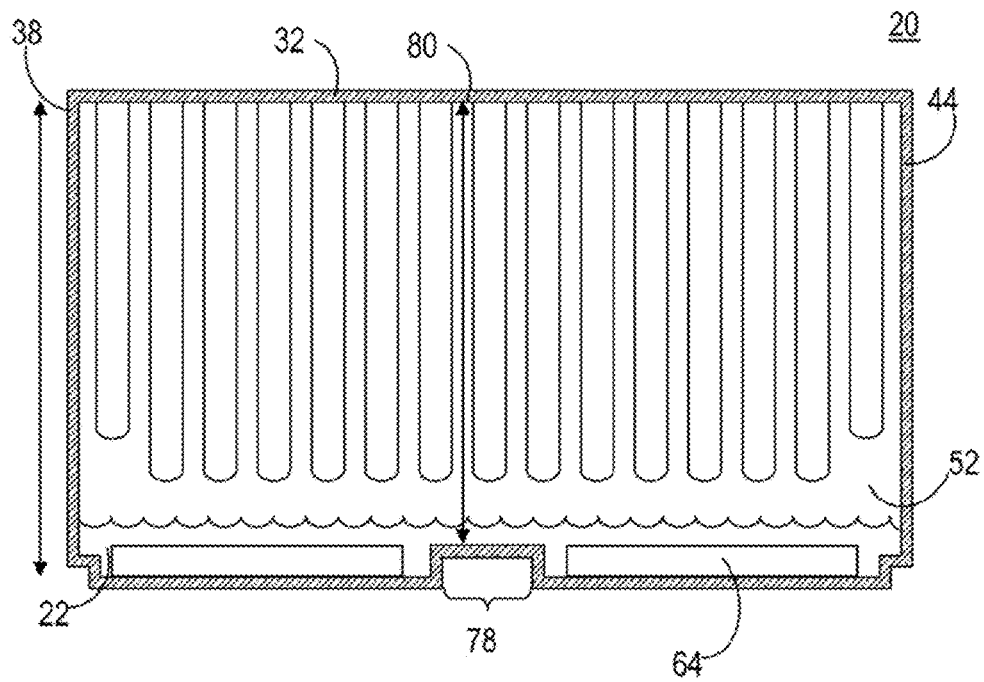
FIG. 4 shows a top view showing a fluid leak containment device in accordance with an alternative preferred embodiment of the present invention.

FIG. 4 is a top view of an alternate embodiment of fluid leak containment device 20. Some cabinets (not shown) have two doors and a vertically extending cabinet center post or stile (not shown) between the two cabinet doors. In order to accommodate this center post, one embodiment of the present invention includes a center post indentation 78. In this embodiment, the distance 80 between back wall 32 and center post indentation 78 is less than the length 62 of the left wall 38 or right wall 44. Center post indentation 78 is positioned in front wall 26 to correspond to the position of the cabinet center post in the cabinet, and may but is not required to abut the cabinet center post when installed in the cabinet. By surrounding the area of the center post in the interior of cabinet, fluid leak containment device 20 redirects the flow of fluid 22 away from the interior of the cabinet, such that if there is a spillover, it will be outside of the cabinet.

In one embodiment, two sensors 64 are used. One sensor 64 is placed in front of each door. As the lowest points of valley 52 may be near front wall 26 abutting the cabinet door, placing the sensors 64 in these positions will increase the likelihood that a fluid leak will be detected. However, one skilled in the art will recognize that sensor 64 may be placed in any position on base 24 to detect the presence of fluid 22 at that location.

FIG. 5 is a cross-sectional view of the alternate embodiment of fluid leak containment device 20 shown in FIG. 4. Center post indentation 78 has a height 82 greater than the height 74 of front wall 26. This greater height at center post indentation 78 increases the likelihood that any spillover will occur away from center post indentation 78, protecting the cabinet center post and the interior of the cabinet.

FIG. 6 is a top view of an alternate embodiment of fluid leak containment device 20. In this embodiment, fluid leak containment device 20 includes base 24, left wall 38 and right wall 44. Base 24 is slanted downward such that fluid 22 will collect at the front 84 of base 24 when a fluid leak occurs. Left wall 38 and right wall 44 protect the walls (not shown) abutting fluid leak containment device 20 from fluid 22 flowing along base 24. In this embodiment, as there is no front wall, fluid 22 will flow down base 24 and will flow onto the floor or other surface (not shown) rather than pooling together near the front 84 of base 24. Sensor 64 may be placed near the front 84 of base 24 to detect the presence of fluid 22 and to provide additional alerts. The slope of base 24 will prevent the flow of fluid 22 backwards, minimizing the need to protect the wall found to the back 86 of fluid leak containment device 20.

Figure 7:
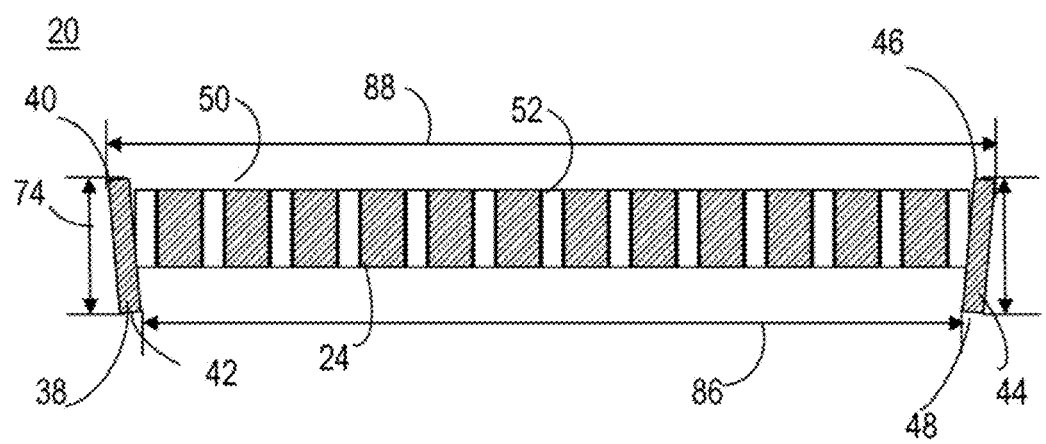
FIG. 7 shows a cross-sectional view of a fluid leak containment device in accordance with a preferred embodiment of the present invention.

FIG. 7 is a cross-sectional view of the alternate embodiment of fluid leak containment device 20 shown in FIG. 6. This view shows base 24, left wall 38 and right wall 44. Base 24 has a series of plateaus 50 and valleys 52. Left wall 38 and right wall 44 are angled such that the distance 88 between bottom edges 42 and 48 is less than the distance 90 between top edges 40 and 46. By having this angled structure, multiple fluid leak containment devices 20 can be stacked one within another for storage, inventory, and distribution purposes.

When fluid leak containment device 20 rests on a surface (not shown), plateaus 50 are horizontal, permitting the storage of items (not shown) upon fluid leak containment device 20. Valleys 52 angle downward, directing the flow of fluid 22 down base 24 to the front 84 (shown in FIG. 6) of fluid leak containment device 20. In one embodiment, a front lip (not shown) is placed at the front 84 of base 24 to permit the pooling of fluid 22 at the front 84 of base 24 prior to fluid 22 spilling over.

As fluid leak containment device 20 can be folded and inserted into small spaces, fluid leak containment device 20 can be molded to fit within small areas such that minimal space exists between back wall 32, left wall 38 and right wall 44 of fluid leak containment device 20 and the cabinet/building wall. Due to this fit, it is unnecessary to secure fluid leak containment device 20 with any additional hardware. However, in one embodiment, caulk or other sealant (not shown) is used between the front portion of containment device 20 and the cabinet shelf upon which it rests to ensure that fluid 22 cannot seep between fluid leak containment device 20 and the cabinet. And, when pipes extend up through the shelf on which containment device 20 rests, containment device 20 may be slit to accommodate the pipes and sealed using silicon or another suitable sealant.

The directional terms, such as left, right, front, back, upward, and downward are relative to the particular orientation reflected in the views shown in FIGS. 1-7 herein, and the common meanings for such terms from the perspective of facing a cabinet in which fluid leak containment device may be installed. One should note that, fluid leak containment device may be oriented in any manner, and that the orientation of fluid leak containment device is not limited to the directions described above.

In summary, the present invention teaches a fluid leak containment device 20 with a front wall 26 having a height less than the height of back wall 32, left wall 38 and right wall 44, permitting spillover to the front of fluid leak containment device 20 such that no spillover will occur on any of the other walls. Base 24 of fluid leak containment device 20 is sloped downward from back wall 32 to front wall 26, such that fluid 22 that leaks onto fluid leak containment device 20 will flow towards front wall 26. Base 24 has plateaus 50 and valleys 52 so that a user may place items upon plateaus 50 for storage and leaked fluid 22 will flow through valleys 52 such that the items will not become wet.

Fluid leak containment device 20 is installed upon any substantially flat surface such that fluid 22 leaking on fluid leak containment device 20 flows towards front wall 26. Fluid leak containment device 20 may be installed without the use of additional hardware components. It is desirable that the juncture between fluid leak containment device 20 and cabinet/building walls be sealed with caulk in the region where an overflow will occur if a sufficient amount of fluid collects at the front of containment device 20. Additionally, fluid leak containment device 20 may also have a center post indentation 78 to accommodate a cabinet center post. Thus, any fluid 22 that may spillover from fluid leak containment device 20 will flow onto a surface outside of the interior area in which fluid leak containment device 20 is installed.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A fluid leak containment device comprising:
    a base comprising at least one plateau and at least one valley;
    a left wall;
    a back wall;
    a right wall; and
    a front wall;
    wherein
        said base is defined between said front wall, said right wall, said back wall and said left wall to form a fluid receiving tray;
        said base is downwardly sloped from said back wall to said front wall;
        said at least one plateau is configured to protrude from said base of said fluid receiving tray and to extend partially into said fluid receiving tray such that said at least one plateau terminates within said fluid receiving tray;
        said at least one plateau has a top surface that remains substantially parallel with a surface upon which the fluid leak containment device rests, the plateau being configured to support an item thereon; and
        said at least one plateau and said at least one valley are configured to direct the flow of a fluid falling on said fluid receiving tray, wherein said fluid receiving tray is configured to collect and retain said fluid therein.

2. The fluid leak containment device as claimed in claim 1 further comprising a plurality of plateaus and a plurality of valleys, wherein neighboring plateaus define therebetween said at least one valley and neighboring valleys define therebetween said at least one plateau; and a support configured in said base to traverse said at least one plateau and fluidically communicate with neighboring valleys.

3. The fluid leak containment device as claimed in claim 2, wherein said support extends below a level of said neighboring valleys and is configured to contact said surface upon which said fluid leak containment device rests and to retain therein said fluid falling on said fluid receiving tray uphill of said support.

4. The fluid leak containment device as claimed in claim 1 further comprising a plurality of plateaus that define therebetween said at least one valley; and a support that is configured to traverse said at least one valley between neighboring plateaus.

5. The fluid leak containment device as claimed in claim 1 further comprising a sensor configured to detect the presence of fluid in said fluid containment device and trigger an alert when said sensor detects the presence of said fluid.

6. The fluid leak containment device as claimed in claim 5 wherein said sensor abuts said front wall.

7. The fluid leak containment device as claimed in claim 5 wherein said alert is an audible or visual alert.

8. The fluid leak containment device as claimed in claim 1, wherein said front wall has a front top edge and a front bottom edge; said back wall has a back top edge and a back bottom edge; and a distance between said back top edge and said back bottom edge is greater than a distance between said front top edge and said front bottom edge.

9. The fluid leak containment device as claimed in claim 1 wherein said front wall and said back wall are configured so that when said containment device is placed on a level surface, fluid in said fluid leak containment device overflows at the front of said fluid leak containment device and is prevented from overflowing at the left wall, the right wall, or the back wall of said fluid leak containment device.

10. The fluid leak containment device as claimed in claim 1 wherein:
said front wall has a front top edge and a front bottom edge;
said back wall has a back top edge and a back bottom edge;
said left wall has a left top edge and a left bottom edge;
said right wall has a right top edge and a right bottom edge;
a distance between said back top edge and said front top edge is greater than a distance between said back bottom edge and said front bottom edge; and
a distance between said left top edge and said right top edge is greater than a distance between said left bottom edge and said right bottom edge.

11. The fluid leak containment device as claimed in claim 1 wherein:
said front wall comprises a center post indentation; and
a distance between said back wall and said center post indentation of said front wall is less than the length of one of said left wall or said right wall.

12. The fluid leak containment device as claimed in claim 11 wherein a height of said front wall at said center post indentation is greater than a height of said front wall outside of said center post indentation.

13. The fluid leak containment device as claimed in claim 1 wherein base comprises a center post indentation.

14. The fluid leak containment device as claimed in claim 1 wherein said fluid leak containment device is molded from a thermoplastic material.

15. The fluid leak containment device as claimed in claim 1 wherein said fluid leak containment device is configured to be folded back on itself and restored to an original shape without cracking.

16. A fluid leak containment device comprising:
a base having opposing edges;
a left wall configured to abut said base on one of said opposing edges; and
a right wall configured to abut said base at another of said opposing edges;
wherein
said base comprises a plurality of plateaus positioned between said left wall and said right wall, said plurality of plateaus configured to protrude from said base to define a plurality of valleys on said base, each valley being positioned between neighboring plateaus on said base;
each of said plurality of plateaus has a top surface that remains substantially parallel with a surface upon which said fluid leak containment device rests, the plurality of plateaus being configured to support an item thereon;
said base slopes at an angle such that a fluid falling on said base flows within one of said plurality of valleys along said base,
said base comprising a support configured in said base to establish fluidic communication between neighboring valleys, said support protruding below a level of said neighboring valleys and configured to contact said surface upon which said fluid leak containment device rests and to retain therein said fluid falling on said fluid receiving tray uphill of said support.

17. The fluid leak containment device as claimed in claim 16 further comprising a sensor configured to detect said fluid and trigger an alert when said fluid is detected.

18. The fluid leak containment device as claimed in claim 17 wherein said alert is an audible alert.

19. The fluid leak containment device as claimed in claim 17 wherein said alert is a visual alert.

20. The fluid leak containment device as claimed in claim 16 wherein:
said left wall has a left top edge and a left bottom edge;
said right wall has a right top edge and a right bottom edge; and
a distance between said left top edge and said right top edge is greater than a distance between said left bottom edge and said right bottom edge.

21. The fluid leak containment device as claimed in claim 16 wherein said fluid leak containment device is molded from a thermoplastic material.

22. The fluid leak containment device as claimed in claim 16, wherein the support is configured to retain therein a portion of said fluid and permit remaining portions of said fluid to flow downhill out of said support and within said neighboring valleys along said base.

23. The fluid leak containment device as claimed in claim 16, wherein the support is oriented orthogonally to the neighboring valleys.

24. A method for detecting leakage of a fluid comprising:
installing a fluid leak containment device comprising:
a fluid receiving tray comprising a base, a left wall, and a right wall;
said base being sloped downward to direct a flow of fluid falling on said base;

said base comprising a plurality of plateaus positioned on the base between said left wall and said right wall, said plurality of plateaus configured to protrude from said base to define a plurality of valleys on said base that direct said flow of fluid, each valley being positioned between neighboring plateaus, each of said plurality of plateaus having a top surface that remains substantially parallel with a surface upon which said fluid leak containment device rests, the plurality of plateaus being configured to support an item thereon; and said base comprising a support configured in said base to establish fluidic communication between neighboring valleys, said support protruding below a level of said neighboring valleys and configured to contact said surface upon which said fluid leak containment device rests and to retain therein said fluid falling on said fluid receiving tray uphill of said support; and checking said base of said fluid leak containment device to determine if leakage has occurred.

25. The method as claimed in claim 24 wherein said checking activity comprises:

detecting the presence of a leak with a sensor;

raising an alert in response to said detecting activity.

* * * * *

UNITED STATES PATENT AND TRADEMARK OFFICE
CERTIFICATE OF CORRECTION

PATENT NO.        : 8,823,532 B1
APPLICATION NO.   : 12/615745
DATED             : September 2, 2014
INVENTOR(S)       : Rollin R. Carlblom Page 1 of 1

It is certified that error appears in the above-identified patent and that said Letters Patent is hereby corrected as shown below:

On the title page item (45), following "Date of Patent:" please replace "Sep. 2, 2014" with --*Sep. 2, 2014--.

Signed and Sealed this
Second Day of December, 2014

Michelle K. Lee
*Deputy Director of the United States Patent and Trademark Office*